United States Patent [19]

Walker

[11] 4,242,763

[45] Jan. 6, 1981

[54] PET TOILET

[76] Inventor: John A. Walker, 663 Lefferts Ave., Brooklyn, N.Y. 11302

[21] Appl. No.: 971,052

[22] Filed: Dec. 19, 1978

[51] Int. Cl.³ .............................................. A47K 17/00
[52] U.S. Cl. .......................................... 119/1; 4/300; 4/661
[58] Field of Search ........................... 4/1, 6, 7; 119/1

[56] References Cited

U.S. PATENT DOCUMENTS

| | | | |
|---|---|---|---|
| 2,053,594 | 9/1936 | Albert | 4/7 X |
| 2,584,656 | 2/1952 | Anderson | 4/6 X |
| 3,688,742 | 9/1972 | McGee | 4/6 X |
| 3,793,988 | 2/1974 | Treegar | 119/1 |
| 3,871,331 | 3/1975 | Breau | 119/1 |
| 3,921,582 | 11/1975 | Sedlmeir | 119/1 |
| 4,098,229 | 7/1978 | Haynes et al. | 119/1 |
| 4,117,555 | 10/1978 | Dennis | 4/1 |

*Primary Examiner*—Henry K. Artis
*Attorney, Agent, or Firm*—Imirie and Smiley

[57] ABSTRACT

The present invention is a dog lavatory that is installable in a basement, apartment bathroom, or a separate area of a residential home or building. The lavatory comprises a hollow, box-shaped platform having a shield mounted around the top thereof. An endless belt extends across the top of the platform and is moveably mounted for receiving animal wastes and transferring them upon movement to the internal portions of the platform. The internal portions of the platform include a drain and built-in trap area. Piping connectable to the residential plumbing conducts liquid therefrom into a perforated service pipe mounted along the top and bottom portions of the shield.

4 Claims, 3 Drawing Figures

PET TOILET

FIELD OF THE INVENTION

The present invention relates to improvements in toilets or lavatories for household pets of the type which are installable to the existing plumbing and sewage systems of a residence.

BACKGROUND OF THE INVENTION

There are many city regulations that a pet lavatory must be in compliance with. Pet lavatories are needed as an improvement in street sanitation. There is also a need for a pet fixture to perform the dual functions of a pet's toilet and a pet's bath. The lavatory should be connectable to the existing building's plumbing and sewage systems and it should have built in features that will reduce installation work and costs.

SUMMARY OF THE INVENTION

The present invention provides a lavatory for pets having a moveable platform which permits cleaning of previously used surfaces. Any waste material is deposited on the upper side of the platform which is then moved to become part of the bottom of the platform thereby depositing the waste matter in a drain and built-in trap area.

Spray piping is provided in a shield area above the platform as a safety feature to prevent soiled water from re-entering the clean water supply system. In the event of any sewage backup, the water will overflow onto the floor on which the lavatory is supported.

An automatic flushing system of the dog lavatory permits its use at all times.

Chemically treated water can be used and is discharged during a flushing operation to provide a sanitary cleaning of the lavatory thereby reducing odors and germs.

In addition, a build-in trap is provided to prevent the backup of sewage odors and conforms to the requirements of health regulations in most metropolitan cities.

The dog lavatory can alternatively be used as a bath by providing hot water connections to the lavatory plumbing and by using a provided spray hose.

The present invention provides a positive flushing action achieved through the use of a quick opening type valve and utilizing ordinary street water pressure, thereby eliminating the need for a water tank. The build-in trap and drain not only eliminates sewer odors and complies with the municipal regulations, but also reduces labor installation cost. A built-in retractable spray hose which is connectable to hot and cold water supplies, permits the lavatory according to the present invention to also be used as a bathing facility for the pet. Automatic operation of the lavatory permitting unattended operation solely by the animal is provided by using the weight of the animal to activate a micro-switch. Finally, the connecting water supply is protected by locating all of the discharge orifices of the spray pipes above the top of the platform. This also creates an air gap that is required by certain city regulations.

In a preferred embodiment of the invention, the animal may be trained to use the lavatory to relieve its waste matter, after which time the lavatory is automatically flushed into the sewage system of the building.

Other details, features and objects of the present invention will be set forth in, or apparent from, the accompanying drawings and detailed description of the preferred embodiment found hereinbelow.

DESCRIPTION OF THE PREFERRED EMBODIMENT

Figure 1:
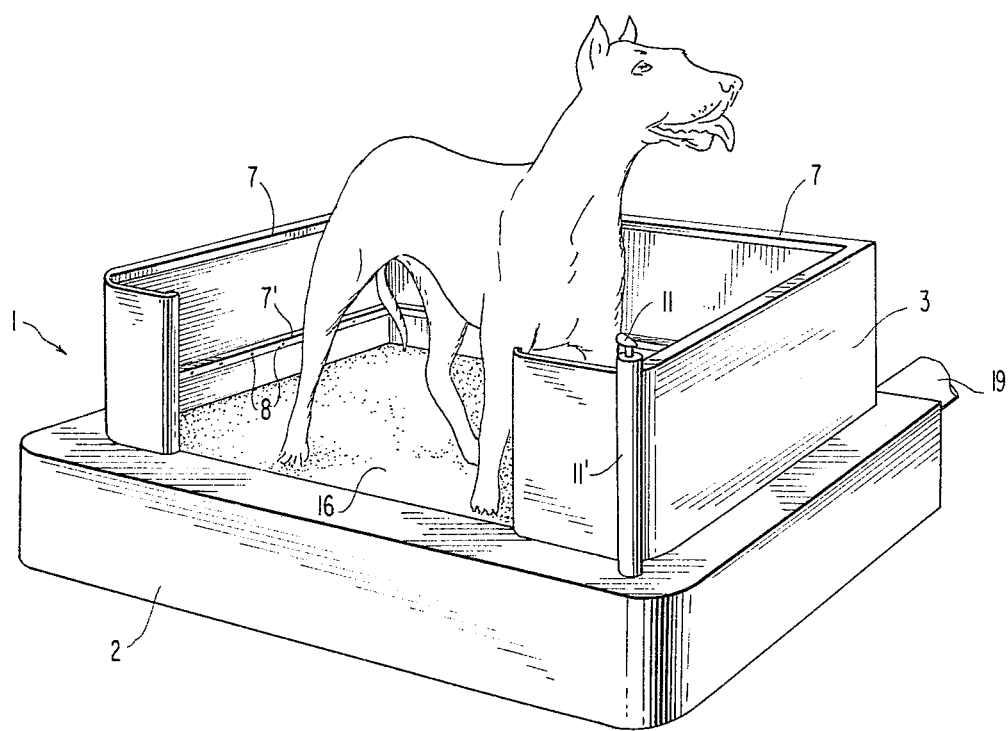
FIG. 1 is a schematic perspective view of an animal lavatory according to the present invention in which a dog is depicted using the lavatory.

Referring now to the figures in which like numerals are used throughout the several views to depict like elements, one embodiment of a pet lavatory 1 is depicted for use with a dog. The lavatory is comprised of a base 2 having a support platform 4 with a bottom 12 (FIG. 2) and an upstanding enclosure walls 3 having an opening therein and mounted on the top of base 2. Base 2 and enclosure walls 3 are constructed of hard plastic that is impervious to an exposure of waste matter. The exterior can be treated or laminated so as to provide longevity. The corners of base 2 are beaded to eliminate sharpness and triangular transition pieces are provided at the top rear portion thereof to connect lower and higher portions. All inside corners of enclosures walls 3 are curved to prevent lodging of waste matter. The height of enclosure walls 3 can vary and are determined by the size of the pet. Support platform 4 is also constructed of a hard plastic material with a surface impervious to waste matter. A moveable belt means such as a rotatable, endless belt 16 is mounted around platform 4 and is constructed of soft rubber or flexible plastic with a non-slip impervious top and bottom surface. The inside surface of belt 16 has a toothed track (not shown) on each side thereof.

Two pairs of gear wheels 10, each wheel being constructed of hard plastic with impervious surfaces, are attached to the underside of support platform 4 at each end thereof. Gear wheels 10 are treated or laminated so as to provide longevity. The gear wheels are interlocked with the toothed track of belt 16 and are driven by a motor that is controlled by a micro-switch (not shown).

Support platform 4, as mentioned above, is constructed of a hard plastic with impervious top and bottom surfaces. Support platform 4 is secured to base 2 and has a thickness and reinforcing as required in order to support the weight of the animal.

Figure 2:
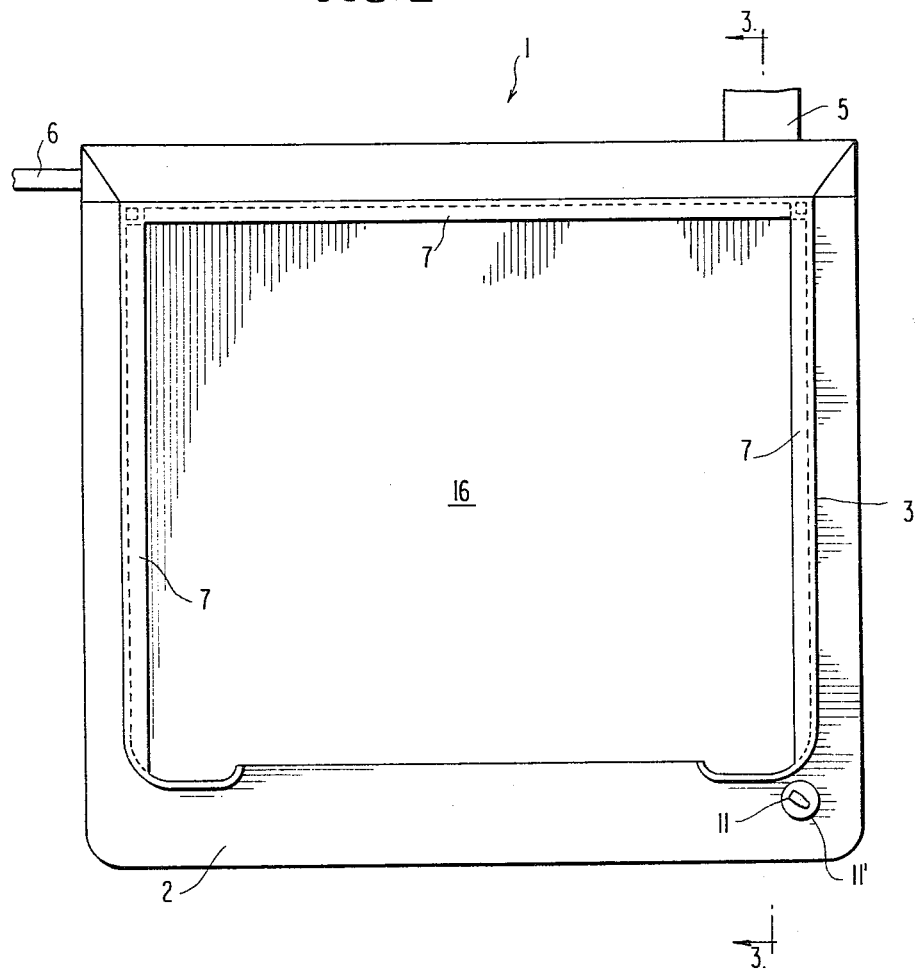
FIG. 2 is a plan view of the present invention.

Located inside base 2 is a drain and built-in trap 5 made of hard plastic with an impervious interior surface. The exterior end of the drain pipe has a copper ferrule to enable it to be leaded to cast iron fittings for installation purposes. A one-inch cold water surface pipe 6 is connectable to the existing plumbing in the building and is connected to base 2 at one corner thereof as shown in FIG. 2. Pipe 6 includes a copper tubing portion, a quick opening type valve (not shown), and a one-inch plastic pipe. Distribution pipes 7, which can be half-inch hard plastic pipes, run along the top and sides of enclosure walls 3 and has a plurality of discharge holes 8 contained therein. The amount of holes and their orientation so as to direct the spray can be determined by laboratory tests. The plastic portion of cold water surface pipe 6 is connected to distribution pipes 7. The exterior of distribution pipes 7 have an impervious surface and the interior is constructed monolithically with enclosure walls 3. Another distribution pipe 7' extends along the horizontal direction at the bottom of enclosure walls 3 and the tops thereof are splayed so as to enable water from above to run off.

Figure 3:
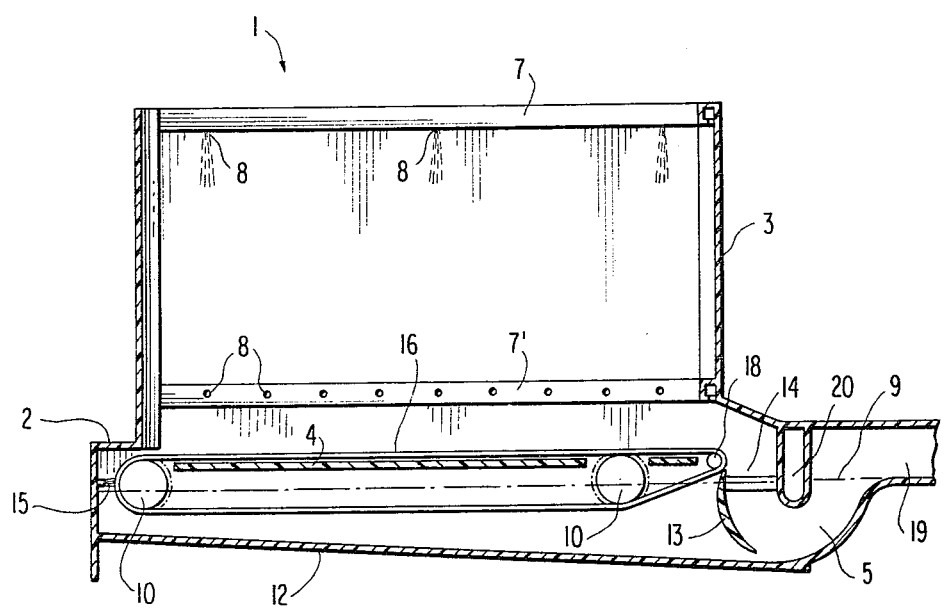
FIG. 3 is a cross-sectional view taken along line 3—3 of FIG. 2.

As best seen in FIG. 3, belt 16 extends around a forward gear wheel 10 (depicted on the left hand side of FIG. 3) and around a rearward gear wheel 10 disposed near, but spaced from the end of belt 1 and also extending through platform 4. The rearward end of belt 16 extends around a small member 18 which has a circular cross-section. Belt 16 moves or rotates clockwise as shown in FIG. 3 such that any waste deposited on the top thereof is transferred to trap area 5. A rubber scrapper 13 constructed of hard plastic with impervious interior surface is located at the end of a trough 14 and engages the underside of belt 16 at the member 18. Trough 14 has a semi-circular shape and pitches inwardly toward trap area 5. Constructed of hard plastic with impervious interior surface, trough 14 is located so as to press rubber scrapper 13 against belt 16 moves or as belt 16 rotates, thereby removing most of the waste matter. The remainder of the waste matter is removed by chemically treated water. Located at the forward end and engaging belt 16 is a stationary hard bristle brush 15. Brush 15 removes excess film before belt 16 emerges from the water, the level of which is shown at 9, and the before it engages the forward end of support platform 4. Both rubber scrapper 13 and brush 15 are easily replaceable.

The bottom of lavatory 1 is constructed of hard plastic with impervious top surface. The bottom is pitched at a maximum allowable angle toward the drain and built-in trap area 5.

A slotted opening at the bottom of the trap, as depicted in the figures, discharges water into the drain. The bottom of lavatory 1 supports the chemically treated, standing water and is constructed sufficiently to support the weight. Built-in trap and drain 5 has exemplary dimensions of three inches in diameter and is constructed of hard plastic with impervious interior surface. A trap and drain pipe 19 is constructed monolithically with lavatory 1. The exterior end of drain pipe 19 has a copper ferrule (not shown) enabling drain pipe 19 to be leaded to cast iron fittings. The exterior surface is treated or laminated so as to provide longevity.

Also provided is a spray hose 11 constructed of flexible rubber with spring-like connection at the free end. Spray hose 11 fits in a housing 11' (FIG. 1) constructed of hard plastic with surfaces treated or laminated so as to provide longevity. If desired, a one-half inch plastic pipe union can extend outside lavatory 1 to serve as a hot water connection. Retractable spray hose 11 is connected to the cold water supply to permit periodic cleaning. The hot water connection provides bathing facilities.

In operation, the weight of the animal activates a micro-switch when supported by platform 4. When the animal leaves platform 4, the micro-switch is further activated, thereby causing the simultaneous rotating of gear wheels 10 in a clockwise direction and opening a water valve of the quick opening type. The rotation of gear wheels 10 rotates belt 16 one half cycle and is then stopped and the water valve is closed. Thus, the top half of belt 16 is now submerged in the chemically treated water while the bottom half has become the top and is ready for the next operation. When belt 16 is rotated clockwise the one half cycle, drain and built-in trap area 5 receives the waste and discharged water. Rubber scrapper 13 cleans wastes off belt 16 as it rotates clockwise discharging the waste into pitched trough 14 and thence into trap area 5 as mentioned above. Stationary brush 15 on the opposite side removes the excess residue from belt 16 before it emerges from the chemically treated water. The water from distribution pipes 7 exiting through orifices 8 located therein washes down the sides of enclosure walls 3 and wets down the top of belt 16 thereby loosening the deposited waste matter. Finally, as can be seen from FIG. 3, because of the added water, water level 9 will rise above the outlet of trap and drain pipe 19 thereby discharging some of the water. When the operation is completed, the chemically treated discharge water returns back to water level 9. Also, as can be seen from FIG. 3, a depending member 20 is mounted in base 2 so as to extend into part of trap area 5 and thereby create a water trap and ensure positive flushing of the waste matter on the one hand and maintaining the water seal on the other.

Although the invention has been described in detail with respect to exemplary embodiments thereof, it will be understood by those of ordinary skill in the art that variations and modifications may be affected within the scope and spirit of the invention.

I claim:

1. A lavatory unit for a pet comprising:
   a housing having a hollow base with a bottom slanted toward one end thereof;
   an upstanding enclosure wall mounted along the bottom thereof to said base and defining an interior lavatory area;
   liquid inlet piping connectable to a source of liquid for providing a source of flushing liquid and mounted on said housing, said inlet piping having orifices thereon for directing flushing liquid against the interior side of said enclosure wall;
   an elongate platform mounted to said base and forming the top thereof, said platform being spaced at two opposing ends from said base;
   sets of spaced gear wheels respectively located at corresponding ones of said opposed platform ends;
   an endless belt mounted around and supported by said platform and at least one of said gear wheels and driven by said gear wheels;
   an end member having a circular cross-section located at said one end of said base and around which said belt extends;
   a trough mounted within said base transversely to said belt and having an arcuate cross-section, the top of said trough being closely spaced from said end member;
   a depending member for defining a liquid seal mounted to said base and spaced on one side thereof from said trough;
   a drain and trap area located at said one end of said base and spaced from and below said end member, said drain and trap area being defined by the base bottom and by said trough and depending member;
   a drain in fluid communication with said trap area and located on the other side of said depending member, the bottom of said drain being located above the bottom of said depending member so that a liquid seal can be formed at the end of said drain and trap area; and
   a scrapper means mounted at the top of said trough in engagement with said belt at said end member for removing most of said waste deposited on said belt and for directing said waste onto said trough and into said drain and trap area.

2. A lavatory unit for a pet as claimed in claim 1 and further comprising a hose housing mounted on said base and a retractable spray hose means mounted to said hose housing connectable to a hot and cold water supply for use in washing a pet in said lavatory.

3. A lavatory unit for a pet as claimed in claim 1 wherein said water piping comprises a first perforated pipe mounted near the top of said enclosure wall and extending around at least a portion thereof for directing flushing water down the sides of said enclosure wall, and a second perforated pipe mounted near the bottom of said enclosure wall, but spaced above said support platform, for directing flushing water on said belt located on said support platform.

4. A lavatory unit for a pet as claimed in claim 1 wherein said belt extends around one set of said gear wheels at said other end of said platform and said lavatory further comprising a brush mounted at said other platform end in engagement with said belt against said one set of said gear wheels.

* * * * *